No. 868,336. PATENTED OCT. 15, 1907.
A. E. FORSELL.
NUT LOCK.
APPLICATION FILED JULY 23, 1906.

WITNESSES:
D. E. Carlsen
M. H. Carlsen.

INVENTOR:
Axel E. Forsell.
BY his ATTORNEY:
A. M. Carlsen.

UNITED STATES PATENT OFFICE.

AXEL E. FORSELL, OF DULUTH, MINNESOTA, ASSIGNOR OF ONE-THIRD TO OTTO L. BARD, OF DULUTH, MINNESOTA.

NUT-LOCK.

No. 868,336.      Specification of Letters Patent.      Patented Oct. 15, 1907.

Application filed July 23, 1906. Serial No. 327,325.

*To all whom it may concern:*

Be it known that I, AXEL E. FORSELL, a subject of the King of Sweden, who have declared my intention to become a citizen of the United States, residing at Duluth, in the county of St. Louis and State of Minnesota, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to nut-locks or means for preventing the accidental loosening and displacement of nuts from bolts used for any purpose and especially for bolts used in the rail joints of railways; and the object is to provide a cheap, durable and efficient nutlock.

This object I attain by the novel construction and arrangement of parts illustrated in the accompanying drawing, in which:—

Figure 1:
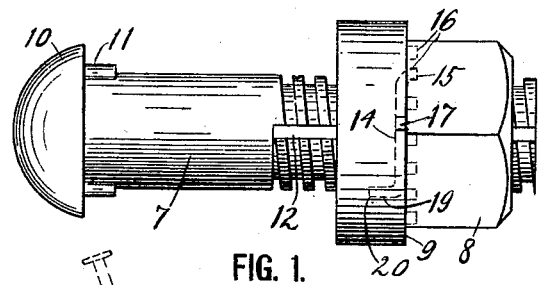
Figures 2, 3:
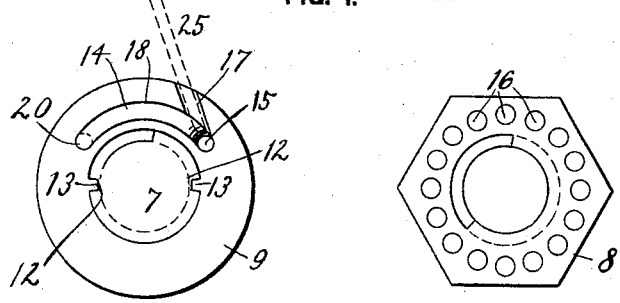
Figure 4:
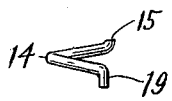

Figure 1 is a side view of a rail bolt provided with my improved nut lock in a general way. Fig. 2 is a right-hand end view of Fig. 1 with the nut removed. Fig. 3 is a left-side view of the nut in Fig. 1. Fig. 4 is a detail view of a spring-tongue or dog used in the device.

Referring to the drawing by reference numerals, 7 designates a rail-joint bolt provided with a nut 8 and a washer 9. When the bolt has the round head 10 it is provided near the head with one or more lugs 11 adapted to engage in the fish-plate or other part to prevent the bolt from turning with the nut 8, but if the bolt has a square or hexagonal head such lugs may be omitted. The bolt may have flat threads as in Fig. 1 or common V-shaped threads, or any other form of thread.

I provide the bolt with at least one longitudinal side groove 12, but I may use two such grooves, as in Fig. 2. In each of said grooves engages an internal projection or key 13 of the washer 9, which is thereby prevented from turning on the bolt. The washer is provided with a spring-arm or tongue 14, whose end 15 engages in either of the indentures 16 formed in the face of the nut and thus prevents its unscrewing, until it is desired to unscrew it, when the end 15 in Fig. 2 may be disengaged from the nut by a small instrument, an awl or even a nail 25, inserted through the notch 17 of the washer, which notch extends from the periphery of the washer to one end of the groove 18 in which the dog or spring 14 lies and has its other end inserted in a hole 20.

The indentures 16 are circularly arranged between the bolt hole and the edges of the nut, so as to meet the projecting end 15 of the spring arm 14, which is formed of a piece of spring wire placed in the groove 18 in the washer, where it is retained by having an angularly bent end 19 inserted in a hole 20 cast or drilled in the washer, which may be cast of gray or malleable iron of sufficient thickness for strength, or may be dropforged. Said end 19 may be driven into the hole or simply held therein by the nut 8.

In using the device the washer is placed on the bolt, the dog put in the groove 18 and the nut screwed home. And when the nut is to be removed, the key or nail 25 is inserted in the notch 17 as shown in Fig. 2, and presses the dog out of the engagement with the indentures in the nut; the key is then left in that position while the nut is unscrewed beyond the reach of the dog, the smooth face of the nut beyond the indentures sliding on the key and thereby holding the dog disengaged during such turning.

Having thus described my invention, what I claim is:

The combination with a bolt and washer guided thereon against turning and having a plane face with a segmental groove in it between the bolt hole and the periphery, and a notch extending from one end of the groove to the periphery of the washer, a spring tongue held in the groove and having its point normally curved beyond the face of the washer close by said notch, of a nut having a plane face going against the washer and in said face, on a circle between the bolt hole and the periphery of the nut, a series of indentures or cavities adapted to engage the end of the tongue; said notch in the washer serving as a key hole for inserting and keeping therein a nail or similar object to keep the tongue disengaged from the nut in unscrewing the latter.

In testimony whereof I affix my signature, in presence of two witnesses.

AXEL E. FORSELL.

Witnesses:
     S. H. ECKMAN,
     H. G. GRODLOST.